United States Patent
Glitsch et al.

(10) Patent No.: US 8,789,084 B2
(45) Date of Patent: Jul. 22, 2014

(54) IDENTIFYING COMMERCIAL BREAKS IN BROADCAST MEDIA

(75) Inventors: Hans M. Glitsch, Quilcene, WA (US); Ajay Shah, Orange, CA (US)

(73) Assignee: Spot411 Technologies, Inc., Orange, CA (US)

( * ) Notice: Subject to any disclaimer, the term of this patent is extended or adjusted under 35 U.S.C. 154(b) by 102 days.

(21) Appl. No.: 13/096,977

(22) Filed: Apr. 28, 2011

(65) Prior Publication Data

US 2011/0202949 A1 Aug. 18, 2011

Related U.S. Application Data (63) Continuation of application No. 12/789,377, filed on May 27, 2010.

(60) Provisional application No. 61/181,472, filed on May 27, 2009.

(51) Int. Cl.
  *H04H 60/32* (2008.01)
  *H04N 21/24* (2011.01)
  *H04N 21/439* (2011.01)
  *H04H 20/14* (2008.01)

(52) U.S. Cl.
  CPC ....... *H04N 21/2407* (2013.01); *H04N 21/4394* (2013.01)
  USPC .................................. 725/18; 725/19; 725/22

(58) Field of Classification Search
  USPC ............................................... 725/18, 21, 22
  See application file for complete search history.

(56) References Cited

U.S. PATENT DOCUMENTS

| | | |
|---|---|---|
| 6,209,028 B1 | 3/2001 | Walker et al. |
| RE37,131 E | 4/2001 | Mankovitz |
| 6,263,505 B1 | 7/2001 | Walker et al. |
| 6,453,252 B1 | 9/2002 | Laroche |
| 6,738,803 B1 | 5/2004 | Dodrill et al. |
| 6,834,308 B1 | 12/2004 | Ikezoye et al. |

(Continued)

FOREIGN PATENT DOCUMENTS

| | | |
|---|---|---|
| WO | WO-2010138776 A1 | 12/2010 |
| WO | WO-2010138776 A2 | 12/2010 |
| WO | WO-2010138776 A3 | 2/2011 |
| WO | WO-2012009500 A2 | 1/2012 |

OTHER PUBLICATIONS

Ke, Yan et al., "Computer Vision for Music Identification", School of Computer Science, Carnegie Mellon, Intel Research, Pittsburgh {yke,dhoiem,rahuls}@cs.cmu.edu http://www.cs.cmu.edu/~yke/musicretrieval/ Mar. 2005, all.

(Continued)

*Primary Examiner* — Chris Parry
(74) *Attorney, Agent, or Firm* — Strategic Patents, P.C.

(57) ABSTRACT

An audio channel of a time-based media presentation provides a basis for synchronizing to the presentation across a variety of platforms independent of when and where the presentation is being viewed. By pre-processing the media into a series of non-unique hashes, and similarly processing an audio stream of the media captured at a client device, a comparison can be made that yields an accurate time offset within the presentation. The comparison may usefully be performed over a data network using a server that hosts data from the pre-processed media, and a variety of applications may be deployed on the client device based on the resulting synchronization.

10 Claims, 6 Drawing Sheets

(56) References Cited

U.S. PATENT DOCUMENTS

| | | |
|---|---|---|
| 6,947,966 B1 | 9/2005 | Oko, Jr. et al. |
| 6,990,453 B2 | 1/2006 | Wang et al. |
| 7,013,301 B2 | 3/2006 | Holm et al. |
| 7,277,766 B1 | 10/2007 | Khan et al. |
| 7,325,013 B2 | 1/2008 | Caruso |
| 7,346,512 B2 | 3/2008 | Wang et al. |
| 7,349,552 B2 | 3/2008 | Levy et al. |
| 7,359,006 B1 | 4/2008 | Xiang et al. |
| 7,359,889 B2 | 4/2008 | Wang et al. |
| 7,421,376 B1 | 9/2008 | Caruso et al. |
| 7,423,983 B1 | 9/2008 | Li et al. |
| 7,516,074 B2 | 4/2009 | Bilobrov |
| 7,567,899 B2 | 7/2009 | Bogdanov |
| 7,587,602 B2 | 9/2009 | Rhoads |
| 7,590,259 B2 | 9/2009 | Levy et al. |
| 7,627,477 B2 | 12/2009 | Wang et al. |
| 7,698,254 B2 | 4/2010 | Grabowski et al. |
| 7,735,101 B2 | 6/2010 | Lanza et al. |
| 7,788,279 B2 | 8/2010 | Mohajer et al. |
| 7,853,438 B2 | 12/2010 | Caruso et al. |
| 7,853,664 B1 | 12/2010 | Wang et al. |
| 7,865,368 B2 | 1/2011 | Wang et al. |
| 7,881,657 B2 | 2/2011 | Wang et al. |
| 8,019,882 B2 | 9/2011 | Rao et al. |
| 2002/0072982 A1 | 6/2002 | Barton et al. |
| 2002/0178410 A1 | 11/2002 | Haitsma et al. |
| 2002/0184505 A1 | 12/2002 | Mihcak et al. |
| 2003/0182663 A1 | 9/2003 | Gudorf et al. |
| 2003/0229900 A1 | 12/2003 | Reisman |
| 2005/0010787 A1 | 1/2005 | Tarbouriech |
| 2005/0147256 A1 | 7/2005 | Peters et al. |
| 2006/0041639 A1 | 2/2006 | Lamkin et al. |
| 2006/0068818 A1 | 3/2006 | Leitersdorf et al. |
| 2006/0125962 A1 | 6/2006 | Shelton et al. |
| 2006/0200034 A1 | 9/2006 | Ricci et al. |
| 2006/0200035 A1 | 9/2006 | Ricci et al. |
| 2006/0271540 A1 | 11/2006 | Williams |
| 2006/0274214 A1 | 12/2006 | Carro |
| 2007/0016918 A1* | 1/2007 | Alcorn et al. .......... 725/22 |
| 2007/0055500 A1 | 3/2007 | Bilobrov |
| 2007/0058949 A1 | 3/2007 | Hamzy et al. |
| 2007/0112565 A1 | 5/2007 | Kim et al. |
| 2007/0168542 A1 | 7/2007 | Gupta et al. |
| 2007/0260634 A1 | 11/2007 | Makela et al. |
| 2008/0148309 A1* | 6/2008 | Wilcox et al. .......... 725/14 |
| 2008/0201140 A1 | 8/2008 | Wells et al. |
| 2008/0209021 A1 | 8/2008 | Shamma |
| 2008/0223202 A1 | 9/2008 | Shi |
| 2008/0249961 A1 | 10/2008 | Harkness et al. |
| 2008/0250100 A1 | 10/2008 | Hatanaka et al. |
| 2009/0082100 A1 | 3/2009 | Zalewski |
| 2009/0113088 A1 | 4/2009 | Illowsky et al. |
| 2009/0138108 A1 | 5/2009 | Teo et al. |
| 2009/0164425 A1 | 6/2009 | Olston et al. |
| 2009/0175499 A1 | 7/2009 | Rosenblatt |
| 2010/0080163 A1 | 4/2010 | Krishnamoorthi et al. |
| 2010/0138561 A1 | 6/2010 | Church |
| 2010/0305729 A1 | 12/2010 | Glitsch et al. |
| 2010/0317396 A1 | 12/2010 | Reynolds et al. |
| 2011/0016172 A1 | 1/2011 | Shah |
| 2011/0202156 A1 | 8/2011 | Glitsch et al. |
| 2011/0202687 A1 | 8/2011 | Glitsch et al. |
| 2011/0208333 A1 | 8/2011 | Glitsch et al. |
| 2011/0208334 A1 | 8/2011 | Glitsch et al. |
| 2011/0209191 A1 | 8/2011 | Shah |
| 2012/0102233 A1 | 4/2012 | Shah et al. |
| 2013/0097632 A1 | 4/2013 | Shah |

OTHER PUBLICATIONS

Lempel, Ronny et al., "Predictive Caching and Prefetching of Query Results in Search Engines", Department of Computer Science the Technion, Haifa, Israel 2003 , all.

"TV Station Market Trial Overview", Sep. 9, 2008 , all.

"What is BlabBlab Live.tv.chat", Feb. 4, 2009 , all.

"International Application Serial No. PCT/US2010/036492, Search Report and Written Opinion mailed Dec. 6, 2010", , 26.

"Project New England Interim Report Q4 2008", Backchannelmedia, Inc www.backchannelmedia.com , all.

"U.S. Appl. No. 13/096,920, Non-Final Office Action mailed Feb. 14, 2013", 67 pages.

"U.S. Appl. No. 13/096,943, Non-Final Office Action mailed Mar. 1, 2013", 56 pages.

"U.S. Appl. No. 13/096,950, Non-Final Office Action mailed Mar. 27, 2013", 20 pages.

"U.S. Appl. No. 12/789,377, Non-Final Office Action mailed Oct. 26, 2012", Oct. 26, 2012 , 28 pgs.

"U.S. Appl. No. 13/096,965, Non Final Office Action mailed Jan. 7, 2013", SN:13096965_NFOA_010713 NPL-17 , 31 pgs.

"PCT Application No. PCT/US11/43944 International Search Report and Written Opinion mailed May 13, 2013", 9 pages.

U.S. Appl. No. 13/708,776, Non-Final Office Action mailed Apr. 25, 2014, 18 pages.

* cited by examiner

IDENTIFYING COMMERCIAL BREAKS IN BROADCAST MEDIA

RELATED APPLICATIONS

This application is a continuation of U.S. patent application Ser. No. 12/789,377 filed May 27, 2010, which claims the benefit of U.S. Prov. App. No. 61/181,472, filed on May 27, 2009, the entire content of each is hereby incorporated by reference.

BACKGROUND

Time-based media presentations such as movies, animation, sports events, live or pre-recorded television broadcasts, and so forth may be presented in a variety of formats and a variety of venues that may range from new movie releases in movie theaters to time-shifted home viewing of pre-recorded television broadcasts. There remains a need for synchronization capabilities that permits individual devices to synchronize to a time-based media presentation regardless of where and when the content is being displayed.

SUMMARY

An audio channel of a time-based media presentation provides a basis for synchronizing to the presentation across a variety of platforms independent of when and where the presentation is being viewed. By pre-processing the media into a series of non-unique hashes, and similarly processing an audio stream of the media captured at a client device, a comparison can be made that yields an accurate time offset within the presentation. The comparison may usefully be performed over a data network using a server that hosts data from the pre-processed media, and a variety of applications may be deployed on the client device based on the resulting synchronization.

In one aspect, a method disclosed herein includes receiving an audio portion of a time-based media presentation with a microphone of a client device; sampling the audio on the client device to obtain a sequence of digital samples of the audio portion; processing the sequence of digital samples to provide a plurality of hashes, each one of the plurality of hashes including a plurality of bits, each one of the plurality of hashes providing a non-unique representation of a segment of the audio portion, and each one of the plurality of hashes having a known relative time offset to each other one of the plurality of hashes; transmitting the plurality of hashes and a unique identifier for the time-based media presentation to a server; receiving from the server a time offset indicative of a current time offset within the time-based media presentation; and synchronizing an application on the client device to the time-based media presentation based upon the time offset.

The client device may include at least one of a mobile device, a cellular phone, a laptop computer, a notebook computer, and a netbook. The time-based media presentation may include one or more of a movie, a sports event, and a television broadcast. Adjacent ones of the plurality of hashes may be calculated from overlapping windows of the sequence of digital samples. Processing may include downsampling the sequence of digital samples to about five thousand five hundred Hertz. Processing may include filtering the sequence of digital samples with a low pass filter to provide a filtered output and transforming the filtered output with a discrete Fourier transform. Processing may include normalizing a magnitude of the sequence of digital samples.

The method may include, on the server, determining an allowable bit error for the plurality of hashes; identifying for each one of the plurality of hashes a set of candidate hashes with a number of bitwise variations from the one of the plurality of hashes no greater than the allowable bit error; locating any candidate time offsets in the time-based media presentation corresponding to each set of candidate hashes for each one of the plurality of hashes; updating scores for the candidate time offsets corresponding to each set of candidate hashes; selecting one of the candidate time offsets having a best one of the scores as the time offset within the time-based media presentation; and transmitting the time offset to the client device.

Determining the allowable bit error may include receiving the allowable bit error from the client device. Each one of the plurality of hashes may consist of thirty two bits and the allowable bit error may be eight bits. Identifying a set of candidate hashes may include providing a binary tree of all possible values for the hash and traversing the binary tree in a manner that excludes branches for binary values that exceed the allowable bit error for the hash. The method may include conditionally transmitting the time offset only when the best one of the scores exceeds a predetermined threshold. The method may include transmitting supplemental information to the server including a hash sequence number that identifies an order of the plurality of hashes relative to one another. Synchronizing may include displaying an indicator on the client device that indicates a synchronization with the time-based media presentation. The method may include rendering additional content on the client device under control of the application, the additional content synchronized to the time-based media presentation. Rendering additional content may include rendering one or more of a supplemental video stream, contextual information, advertising, and interactive content.

A computer program product for audio-based synchronization disclosed herein may include code that performs the steps of: receiving an audio portion of a time-based media presentation with a microphone of a client device; sampling the audio on the client device to obtain a sequence of digital samples of the audio portion; processing the sequence of digital samples to provide a plurality of hashes, each one of the plurality of hashes including a plurality of bits, each one of the plurality of hashes providing a non-unique representation of a segment of the audio portion, and each one of the plurality of hashes having a known relative time offset to each other one of the plurality of hashes; transmitting the plurality of hashes and a unique identifier for the time-based media presentation to a server; receiving from the server a time offset indicative of a current time offset within the time-based media presentation; and synchronizing an application on the client device to the time-based media presentation based upon the time offset.

The client device may include at least one of a mobile device, a cellular phone, a laptop computer, a notebook computer, and a netbook. The time-based media presentation may include one or more of a movie, a sports event, and a television broadcast. Adjacent ones of the plurality of hashes are calculated from overlapping windows of the sequence of digital samples. Processing may include downsampling the sequence of digital samples to about five thousand five hundred Hertz. Processing may include filtering the sequence of digital samples with a low pass filter to provide a filtered output and transforming the filtered output with a discrete Fourier transform. Processing may include normalizing a magnitude of the sequence of digital samples.

The computer program product may further include code that when executing on a server performs the steps of: determining an allowable bit error for the plurality of hashes; identifying for each one of the plurality of hashes a set of candidate hashes with a number of bitwise variations from the one of the plurality of hashes no greater than the allowable bit error; locating any candidate time offsets in the time-based media presentation corresponding to each set of candidate hashes for each one of the plurality of hashes; updating scores for the candidate time offsets corresponding to each set of candidate hashes; selecting one of the candidate time offsets having a best one of the scores as the time offset within the time-based media presentation; and transmitting the time offset to the client device.

The allowable bit error may be a variable bit error received from the client device. Each one of the plurality of hashes may consists of thirty two bits and the allowable bit error may be eight bits. Identifying the set of candidate hashes may include providing a binary tree of all possible values for the hash and traversing the binary tree in a manner that excludes branches for binary values that exceed the allowable bit error for the hash. The computer program product may include code that, when executing on the server, performs the step of conditionally transmitting the time offset only when the best one of the scores exceeds a predetermined threshold. The computer program product may include code that, when executing on one or more computers, performs the step of transmitting supplemental information to the server including a hash sequence number that identifies an order of the plurality of hashes relative to one another. Synchronizing may include displaying an indicator on the client device that indicates a synchronization with the time-based media presentation. The computer program product may include code that performs the step of rendering additional content on the client device under control of the application, the additional content synchronized to the time-based media presentation. Rendering additional content may include rendering one or more of a supplemental video stream, contextual information, advertising, and interactive content.

In another aspect, a device disclosed herein includes a microphone that receives an audio portion of a time-based media presentation and converts the audio portion into electrical signals; an analog-to-digital converter coupled to the microphone that receives the electrical signals and provides a sequence of digital samples of the audio portion; a network interface for communicating over a data network; a processor coupled to the network interface and the analog-to-digital converter, the processor including processing circuitry configured to perform the steps of processing the sequence of digital samples to provide a plurality of hashes, each one of the plurality of hashes including a plurality of bits, each one of the plurality of hashes providing a non-unique representation of a segment of the audio portion, and each one of the plurality of hashes having a known relative time offset to each other one of the plurality of hashes, and the processor further configured to transmit the plurality of hashes and a unique identifier for the time-based media presentation to a server through the network interface and to receive from the server a time offset indicative of a current time offset within the time-based media presentation; and a display under control of the processor that renders an output synchronized to the time-based media presentation according to the time offset.

The microphone, the analog-to-digital converter, the processor, the network interface, and the display may be integrated into a housing for at least one of a mobile device, a cellular phone, a laptop computer, a notebook computer, and a netbook. The time-based media presentation may include one or more of a movie, a sports event, and a television broadcast. Adjacent ones of the plurality of hashes may be calculated from overlapping windows of the sequence of digital samples. Processing may include downsampling the sequence of digital samples to about five thousand five hundred Hertz. Processing may include filtering the sequence of digital samples with a low pass filter to provide a filtered output and transforming the filtered output with a discrete Fourier transform. Processing may include normalizing a magnitude of the sequence of digital samples.

The server may be configured to perform the steps of: determining an allowable bit error for the plurality of hashes; identifying for each one of the plurality of hashes a set of candidate hashes with a number of bitwise variations from the one of the plurality of hashes no greater than the allowable bit error; locating any candidate time offsets in the time-based media presentation corresponding to each set of candidate hashes for each one of the plurality of hashes; updating scores for the candidate time offsets corresponding to each set of candidate hashes; selecting one of the candidate time offsets having a best one of the scores as the time offset within the time-based media presentation; and respond to the network interface with the time offset.

The allowable bit error may be a variable bit error received by the server from the network interface. Each one of the plurality of hashes may consist of thirty two bits and the allowable bit error may be eight bits. Identifying a set of candidate hashes may include providing a binary tree of all possible values for the hash and traversing the binary tree in a manner that excludes branches for binary values that exceed the allowable bit error for the hash. Transmitting the time offset may include conditionally transmitting the time offset only when the best one of the scores exceeds a predetermined threshold. The processor may be further configured to transmit supplemental information to the server including a hash sequence number that identifies an order of the plurality of hashes relative to one another. Synchronizing may include displaying an indicator on the client device that indicates a synchronization with the time-based media presentation. The processor may be further configured to render additional content on the display under control of the processor, the additional content synchronized to the time-based media presentation. The additional content may include one or more of a supplemental video stream, contextual information, advertising, and interactive content.

In another aspect, a method disclosed herein includes receiving an audio portion of a time-based media presentation with a microphone of a client device as a plurality of digital samples; processing the plurality of digital samples to obtain a plurality of hashes, each one of the plurality of hashes non-uniquely corresponding to a portion of the time-based media presentation, and each one of the plurality of hashes having a relative time offset to each other one of the plurality of hashes; and analyzing the plurality of hashes to determine a time offset within the time-based media presentation most closely corresponding to the plurality of hashes.

Analyzing the plurality of hashes may include transmitting the plurality of hashes to a server over a data network. The method may include receiving from the server the time offset within the time-based media presentation. The method may include receiving from the server one or more candidate offsets for each one of the plurality of hashes and locally processing the one or more candidate offsets to determine the time offset within the time-based media presentation. The method may include transmitting supplemental information to the server including an identifier that uniquely identifies the time-based media presentation. The method may include transmitting supplemental information to the server including a hash sequence number that identifies an order of each one of the plurality of hashes relative to one or more other ones of the plurality of hashes. Processing the plurality of digital samples may include processing more than one of the plurality of digital samples to create each one of the plurality of hashes. Processing the plurality of digital samples may include processing more than one of the plurality of digital samples to provide a calculated hash and determining a number of bitwise variations to the calculated hash to provide two or more of the plurality of hashes.

The number of bitwise variations to the calculated hash may include each value with no more bitwise variations from the calculated hash than an allowable error rate. The client device may include at least one of a computer, a cellular phone, and a portable digital device. The time-based media presentation may include a live television broadcast. The time-based media presentation may include a time-shifted replay of a television broadcast. The time-based media presentation may include pre-recorded media from one or more of a CD, a DVD, a Blu-ray Disc, and an HDDVD. Processing the plurality of digital samples may include filtering the plurality of digital samples with a low pass filter and transforming the resulting data with a discrete Fourier transform. Processing the plurality of digital sample may include normalizing a magnitude of the plurality of digital samples. The method may include synchronizing to the time-based media presentation and rendering supplemental content on the client device that may be time-synchronized to the time-based media presentation. Synchronizing may include synchronizing an application executing on the client device. The method may include displaying an indication of synchronization status on the client device. The method may include conditionally synchronizing the application to the time-based media presentation only when the time-offset can be determined with a predetermined certainty. The supplemental content may include an advertisement. The supplemental content may include content retrieved from a remote site through a data network.

In another aspect, a computer program product for synchronizing to media described herein includes computer executable code embodied on a non-transitory computer readable medium that, when executing on one or more computing devices, performs the steps of: receiving an audio portion of a time-based media presentation with a microphone of a client device as a plurality of digital samples; processing the plurality of digital samples to obtain a plurality of hashes, each one of the plurality of hashes non-uniquely corresponding to a portion of the time-based media presentation, and each one of the plurality of hashes having a relative time offset to each other one of the plurality of hashes; and analyzing the plurality of hashes to determine a time offset within the time-based media presentation most closely corresponding to the plurality of hashes.

In another aspect, a system disclosed herein includes: receiving means for receiving an audio portion of a time-based media presentation with a microphone of a client device as a plurality of digital samples; processing means for processing the plurality of digital samples to obtain a plurality of hashes, each one of the plurality of hashes non-uniquely corresponding to a portion of the time-based media presentation, and each one of the plurality of hashes having a relative time offset to each other one of the plurality of hashes; and analyzing means for analyzing the plurality of hashes to determine a time offset within the time-based media presentation most closely corresponding to the plurality of hashes.

In another aspect, a device disclosed herein includes a microphone that receives an audio portion of a time-based media presentation and converts the audio portion into electrical signals; an analog-to-digital converter coupled to the microphone that receives the electrical signals and provides a sequence of digital samples of the audio portion; a processor coupled to the analog-to-digital converter, the processor including processing circuitry configured to perform the steps of processing the sequence of digital samples to obtain a plurality of hashes, each one of the plurality of hashes non-uniquely corresponding to a portion of the time-based media presentation, and each one of the plurality of hashes having a relative time offset to each other one of the plurality of hashes, and analyzing the plurality of hashes to determine a time offset within the time-based media presentation most closely corresponding to the plurality of hashes, and to provide an output synchronized to the time offset within the time-based media; and a display that renders the output.

The device may include a data network interface, wherein the processing circuitry may be further configured to transmit the plurality of hashes to a remote server through the data network interface and to receive through the data network interface from the server data indicative of the time offset.

In another aspect, a method disclosed herein includes: receiving a time-based media presentation that may include an audio portion; sampling the audio to obtain a sequence of digital samples of the audio portion; processing the sequence of digital samples to provide a plurality of hashes, each one of the plurality of hashes non-uniquely corresponding to one or more time offsets within the time-based media presentation; storing the plurality of hashes and the one or more time offsets in a hash table on a server; and configuring the server to respond to a request that contains a second plurality of hashes, each one of the second plurality of hashes having a predetermined relative offset to each other one of the second plurality of hashes, by retrieving from the hash table a plurality of candidate offsets within the time-based media presentation corresponding to the second plurality of hashes.

The method may include transmitting the plurality of candidate offsets from the server to a client device that initiated the request. The method may include resolving the plurality of candidate offsets into an offset within the time-based media presentation that most closely corresponds to the plurality of candidate offsets on the client device. The method may include resolving the plurality of candidate offsets into an offset within the time-based media presentation that most closely corresponds to the plurality of candidate offsets and transmitting the offset to the client device that initiated the request. The method may include calculating on the server a plurality of bitwise variations to each one of the second plurality of hashes, thereby providing a third plurality of hashes representative of the second plurality of hashes and a number of bit errors therein, and retrieving any time offsets corresponding to each one of the third plurality of hashes as the plurality of candidate offsets. The second plurality of hashes received by the server may include a number of bitwise variations to client-calculated hashes, wherein the number of bitwise variations are representative of potential bit errors in the client-calculated hashes. The method may include storing on the server a plurality of hash tables for each one of a plurality of time-based media presentations. The method may include receiving from a client device that initiated the request a unique identification of the one of the plurality of time-based media presentations from which the second plurality of hashes was obtained. The plurality of time-based media presentations include television broadcasts. The plurality of time-based media presentations include pre-recorded media distributed on one or more of a CD, a DVD, a Blu-ray Disc, and an HDDVD. The second plurality of hashes may be obtained from a time shifted viewing of one of the plurality of time-based media presentations. Processing the sequence of digital samples to provide a plurality of hashes may include low pass filtering the sequence of digital samples. Processing the sequence of digital samples to provide a plurality of hashes may include normalizing a magnitude of the sequence of digital samples. Processing the sequence of digital samples may include windowing the sequence of digital samples to provide a series of overlapping sets of digital samples from the sequence of digital samples. Processing the sequence of digital samples may include transforming each one of the overlapping sets of digital samples into a frequency-domain representation. Processing the sequence of digital samples may include dividing the frequency-domain representation into a plurality of frequency bands and converting each one of the plurality of frequency bands into a binary value according to a relative power of the one of the plurality of frequency bands to the other ones of the plurality of frequency bands within the frequency-domain representation. The binary value may consist of a one or a zero.

In another aspect, a system disclosed herein includes receiving means for receiving a time-based media presentation that may include an audio portion; sampling means for sampling the audio to obtain a sequence of digital samples of the audio portion; processing means for processing the sequence of digital samples to provide a plurality of hashes, each one of the plurality of hashes non-uniquely corresponding to one or more time offsets within the time-based media presentation; storing means for storing the plurality of hashes and the one or more time offsets in a hash table; and server means for responding to a request that contains a second plurality of hashes, each one of the second plurality of hashes having a predetermined relative offset to each other one of the second plurality of hashes, by retrieving from the hash table a plurality of candidate offsets within the time-based media presentation corresponding to the second plurality of hashes.

In another aspect, a computer program product for audio-based synchronization disclosed herein includes computer executable code embodied on a non-transitory computer readable medium that, when executing on one or more computing devices, performs the steps of: receiving a time-based media presentation that may include an audio portion; sampling the audio to obtain a sequence of digital samples of the audio portion; processing the sequence of digital samples to provide a plurality of hashes, each one of the plurality of hashes non-uniquely corresponding to one or more time offsets within the time-based media presentation; storing the plurality of hashes and the one or more time offsets in a hash table on a server; and configuring the server to respond to a request that contains a second plurality of hashes, each one of the second plurality of hashes having a predetermined relative offset to each other one of the second plurality of hashes, by retrieving from the hash table a plurality of candidate offsets within the media-based presentation corresponding to the second plurality of hashes.

In another aspect, a device disclosed herein includes a database that stores a hash table, hash table containing a plurality of hashes, each one of the plurality of hashes processed from a sequence of digital samples in an audio portion of a time-based media presentation, wherein each one of the plurality of hashes non-uniquely corresponding to one or more time offsets within the time-based media presentation; and a server coupled in a communicating relationship with the database and a data network, the server configured to respond to a request that contains a second plurality of hashes, each one of the second plurality of hashes having a predetermined relative offset to each other one of the second plurality of hashes, by retrieving from the hash table a plurality of candidate offsets within the time-based media presentation that corresponding to the second plurality of hashes.

In another aspect, a method disclosed herein includes: transmitting a broadcast of a time-based media presentation; receiving audience feedback relating to the time-based media presentation over a data network during the broadcast thereby providing live audience feedback; synchronizing at least one client device to a time-shifted view of the time-based media presentation; receiving additional client feedback from the client device synchronously with the time-shifted view; and combining the additional client feedback with the live audience feedback according to a time offset within the time-based media presentation, thereby providing feedback data that aggregates audience feedback synchronized to both of a live version of the time-based media presentation and the time-shifted view of the time-based media presentation.

The time-based media presentation may be a sports event. The time-based media presentation may be a live television broadcast. The time-based media presentation may be a pre-recorded television broadcast. Synchronizing may include synchronizing based upon audio content within the time-based media presentation. Synchronizing may include receiving a plurality of hashes of the audio content from the client device and resolving the time offset within the time-shifted view based upon the plurality of hashes. The client device may include one or more of a laptop computer, a notebook computer, a mobile device, and a cellular phone.

In another aspect, a computer program product for tracking audience participation described herein includes computer executable code embodied in a non-transitory computer readable medium that, when executing on one or more computing devices, performs the steps of: transmitting a broadcast of a time-based media presentation; receiving audience feedback relating to the time-based media presentation over a data network during the broadcast thereby providing live audience feedback; synchronizing at least one client device to a time-shifted view of the time-based media presentation; receiving additional client feedback from the client device synchronously with the time-shifted view; and combining the additional client feedback with the live audience feedback according to a time offset within the time-based media presentation, thereby providing feedback data that aggregates audience feedback synchronized to both of a live version of the time-based media presentation and the time-shifted view of the time-based media presentation.

The time-based media presentation may be a sports event. The time-based media presentation may be a live television broadcast. The time-based media presentation may be a pre-recorded television broadcast. Synchronizing may include synchronizing based upon audio content within the time-based media presentation. Synchronizing may include receiving a plurality of hashes of the audio content from the client device and resolving the time offset within the time-shifted view based upon the plurality of hashes. The client device may include one or more of a laptop computer, a notebook computer, a mobile device, and a cellular phone.

In another aspect, a device disclosed herein includes: an interface to a data network; a database; and a processor configured to receive and audience feedback over a data network relating to a live television broadcast, and to store the audience feedback in the database as live audience feedback; the processor further configured to synchronize at least one client device to a time-shifted view of the live television broadcast based upon audio content within the time-shifted view of the live television broadcast, and to receive additional client feedback from the at least one client device over the data network synchronously with the time-shifted view; and to combine the additional client feedback with the live audience feedback according to a time offset within the time-based media presentation, thereby providing feedback data that aggregates audience feedback synchronized to both the live television broadcast and a time-shifted view of the live television broadcast.

The processor may be further configured to transmit supplement content to the at least one client device that may be synchronized to the time-shifted view. The data network may include the Internet. The interface to the data network may include a web server. The processor may be configured to synchronize the at least one client device to the time-shifted view based upon a plurality of hashes created by the client device based upon the audio content and transmitted to the processor over the data network. The audience feedback may include responses to explicit audience questions.

In another aspect, a method disclosed herein includes: receiving a plurality of hashes of audio content over a data network from a plurality of client devices exposed to a television broadcast; and identifying an occurrence of a commercial break in the television broadcast based upon variations in concurrent ones of the plurality of hashes received from different ones of the client devices.

The method may include identifying a channel change in proximity to one of the plurality of client devices based upon a variation in the ones of the plurality of hashes received from the one of the plurality of client devices and other ones of the plurality of hashes received concurrently from other ones of the plurality of client devices. The method may include inferring a geographic proximity among two or more of the plurality of client devices based upon a similarity of concurrent ones of the plurality of hashes received from the two or more of the plurality of client devices during the commercial break. The method may include determining whether a local advertisement or a network advertisement may be being aired during the commercial break based upon variations among the plurality of hashes received from different ones of the plurality of client devices. The plurality of client devices may include one or more of a laptop computer, a notebook computer, a netbook computer, a cellular phone, and a personal digital device. Each one of the plurality of hashes may include a processed representation of digital samples of the audio content captured by each one of the plurality of client devices.

In another aspect, a computer program product disclosed herein includes computer executable code that, when executing on one or more computing devices, performs the steps of: receiving a plurality of hashes of audio content over a data network from a plurality of client devices exposed to a television broadcast; and identifying an occurrence of a commercial break in the television broadcast based upon variations in concurrent ones of the plurality of hashes received from different ones of the client devices.

The computer program product may include code that performs the step of identifying a channel change in proximity to one of the plurality of client devices based upon a variation in the ones of the plurality of hashes received from the one of the plurality of client devices and other ones of the plurality of hashes received concurrently from other ones of the plurality of client devices. The computer program product may include code that performs the step of inferring a geographic proximity among two or more of the plurality of client devices based upon a similarity of concurrent ones of the plurality of hashes received from the two or more of the plurality of client devices during the commercial break. The computer program product may include code that performs the step of determining whether a local advertisement or a network advertisement may be being aired during the commercial break based upon variations among the plurality of hashes received from different ones of the plurality of client devices. The plurality of client devices include one or more of a laptop computer, a notebook computer, a netbook computer, a cellular phone, and a personal digital device. Each one of the plurality of hashes may include a processed representation of digital samples of the audio content captured by each one of the plurality of client devices.

In one aspect, a method disclosed herein includes receiving a plurality of hashes of audio content over a data network from a plurality of client devices exposed to a television broadcast; and identifying an occurrence of a commercial break in the television broadcast based upon variations in concurrent ones of the plurality of hashes received from different ones of the client devices.

The method may include identifying a channel change in proximity to one of the plurality of client devices based upon a variation in the ones of the plurality of hashes received from the one of the plurality of client devices and other ones of the plurality of hashes received concurrently from other ones of the plurality of client devices. The method may include inferring a geographic proximity among two or more of the plurality of client devices based upon a similarity of concurrent ones of the plurality of hashes received from the two or more of the plurality of client devices during the commercial break. The method may include determining whether a local advertisement or a network advertisement is being aired during the commercial break based upon variations among the plurality of hashes received from different ones of the plurality of client devices. The plurality of client devices may include one or more of a laptop computer, a notebook computer, a netbook computer, a cellular phone, and a personal digital device. Each one of the plurality of hashes may include a processed representation of digital samples of the audio content captured by each one of the plurality of client devices.

In another aspect, a computer program product described herein embodied in a non-transitory computer readable medium, the computer program product includes computer executable code that, when executing on one or more computing devices, performs the steps of: receiving a plurality of hashes of audio content over a data network from a plurality of client devices exposed to a television broadcast; and identifying an occurrence of a commercial break in the television broadcast based upon variations in concurrent ones of the plurality of hashes received from different ones of the client devices.

The computer program product may include code that performs the step of identifying a channel change in proximity to one of the plurality of client devices based upon a variation in the ones of the plurality of hashes received from the one of the plurality of client devices and other ones of the plurality of hashes received concurrently from other ones of the plurality of client devices. The computer program product may include code that performs the step of inferring a geographic proximity among two or more of the plurality of client devices based upon a similarity of concurrent ones of the plurality of hashes received from the two or more of the plurality of client devices during the commercial break. The computer program product may include code that performs the step of determining whether a local advertisement or a network advertisement is being aired during the commercial break based upon variations among the plurality of hashes received from different ones of the plurality of client devices. The plurality of client devices may include one or more of a laptop computer, a notebook computer, a netbook computer, a cellular phone, and a personal digital device. Each one of the plurality of hashes may include a processed representation of digital samples of the audio content captured by each one of the plurality of client devices.

DRAWINGS

The invention may be more fully understood with reference to the accompanying drawings wherein.

DETAILED DESCRIPTION

Disclosed herein are systems, methods, devices, computer code, and means for synchronizing to a time-based media presentation based upon an audio channel of the time-based media presentation. It will be understood that while an audio channel provides one useful source for synchronization, any channel such as a video, slide show, or concurrent data channel may also or instead be used for synchronization as described herein.

Figure 1:
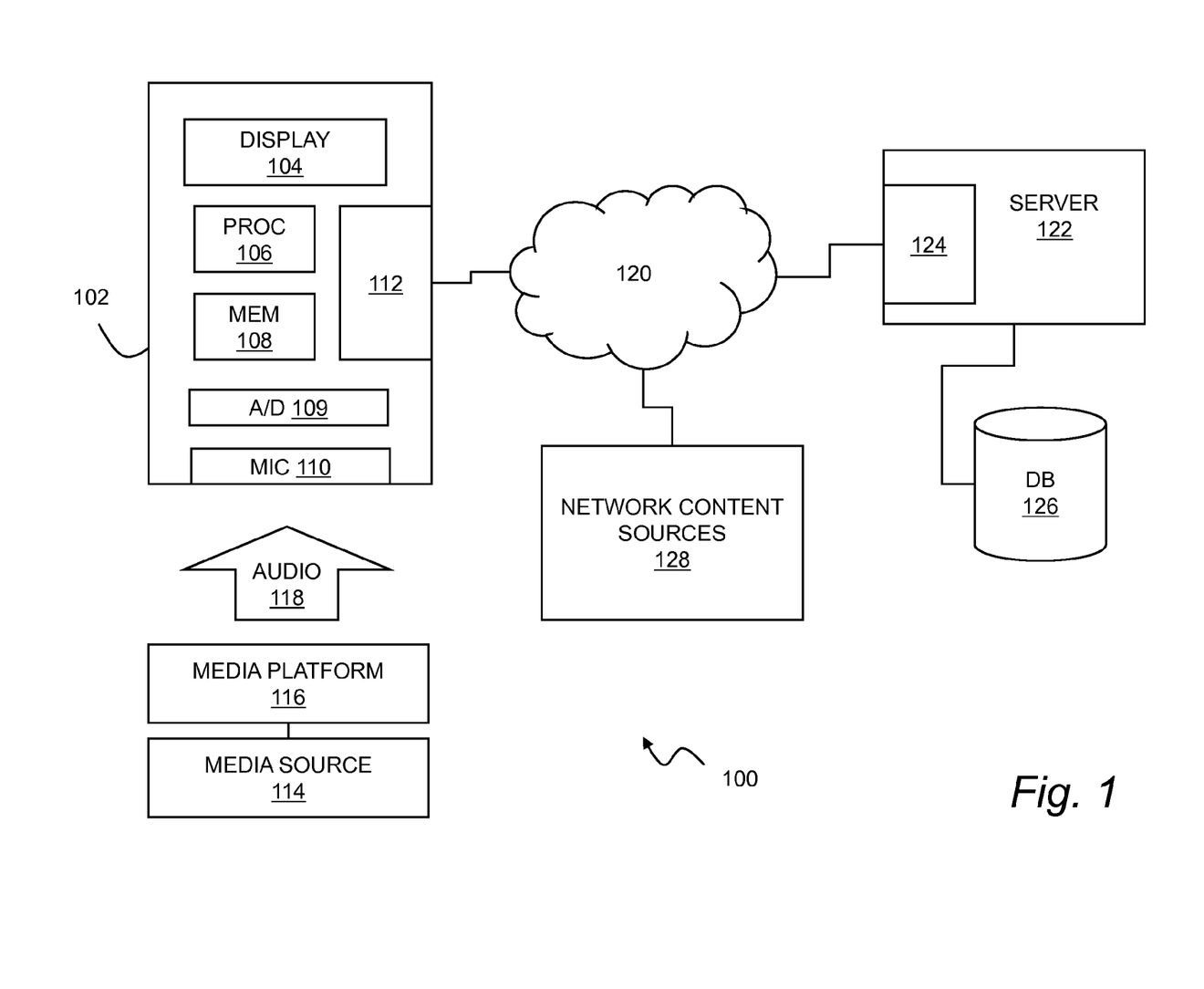
FIG. 1 is a block diagram of a synchronization system.

FIG. 1 is a block diagram of a synchronization system. The system 100 may include a client device 102 with a display 104, a processor 106, a memory 108, an analog-to-digital converter 109, a microphone 110, and a data network interface 112. The system may further include a media source 114, a media platform 116 that emits an audio portion 118 of a time-based media presentation, a data network 120, a server 122 including a data network interface 124 and a database 126, and data network content sources 128.

The client device 102 may be any device with a housing having a microphone 110, a data network interface 112, and other components collectively capable of performing the functions generally described herein. By way of example and not of limitation, this may include a laptop computer, a notebook computer, a netbook computer, and a desktop computer. This may also or instead include a communication device such as a cellular phone, electronic mail device, or the like. The client device 102 may also or instead include a mobile device such as a personal digital assistant, media player, smart phone, iPod, or the like.

The display 104 may be a screen or the like for displaying graphical information. By way of generality, the client device 102 may also provide for any of a variety of outputs including text, pictures, video, sound, and so forth, and all such output devices, or any other output devices that can be controlled by the client device 102 to provide information (e.g., buzzers, light-emitting diodes, etc.) are intended to fall within the scope of the display 104 as that term is used herein.

The processor 106 may include a general purpose microprocessor, a digital signal processor, an application specific integrated circuit, or any other processing circuitry or combination of the foregoing that controls operation of the client device 102 and the components thereof, as further programmed or otherwise configured to perform the additional processing for synchronization as described herein. This may in general include software executing on a general processing unit of the processor 106, or a dedicated, special purpose processor or other processing circuitry or hardware configured to perform the synchronization functions described herein, or a chipset or the like controlled by the processor to perform the synchronization functions described herein. All such variations that would be apparent to one of ordinary skill in the art are intended to fall within the scope of this disclosure.

The memory 108 may include any conventional memory for an electronic device suitable for storing digital samples from the microphone 110, and otherwise supporting synchronization functions as described herein.

The analog-to-digital converter 109 may be any combination of circuits, processors, chips, chipsets and the like suitable for capturing a sequence of digital samples from an analog microphone signal received from the microphone 110. One common sampling rate consistent with Compact Disc quality audio is 44.1 kHz with 16 bit samples. However, it will be understood that other rates a sample sizes are commonly employed in a variety of applications, and larger or smaller samples, at higher or lower sample rates may be provided by the analog-to-digital converter without departing from the scope of this disclosure.

The microphone 110 may be any microphone capable of converting audio energy to electrical signals for use by the analog-to-digital converter 109. This may for example include a microphone integrated into the client device 102, or an external microphone connected to the client device 102 through a jack or input plug, or some combination of these. It should also be appreciated that while specific hardware is described, this description is by way of an example of a common, commercially available architecture. But more generally, any combination of components suitable for converting audio energy into digital samples may be suitably adapted to use with the client device 102 described herein.

The data network interface 112 may include any hardware for connecting the client device 102 in a communicating relationship with a data network such as the data network 120. This may for example include a data network interface card for wired Ethernet or other wired connectivity, or this may include a wireless data networking circuit supporting standardized or proprietary data network communications. Common standards that may be usefully employed in the data network interface 112 of the client device 102 include Bluetooth, IEEE 802.11 (e.g., WiFi), IEEE 802.16 (e.g., WiMax), and cellular or other wide area broadband data standards, as well as combinations of the foregoing.

The media source 114 may be any source of a time-based media presentation. This may, for example, include a DVD, HDDVD, Blu-ray Disc, or other optical, magnetic, or electronic media having content pre-recorded thereon, along with any computer, disc player, tape player, or other device used to provide an electronic version of the pre-recorded content. The media source 114 may also include a broadcast medium such as analog or digital television broadcasts, cable television, Internet television, and so forth. The media source 114 may also include a source of media for time-shifted viewing of a television broadcast or the like such as a Digital Video Recorder, or other local or data networked archive of content for time-shifted viewing. This may also or instead include on-demand programming received through a cable data network, a data network (e.g., the Internet) or the like. This may also or instead include streaming media from an Internet data source or the like. While video multimedia such as movies, sports events, television broadcasts, and any other live or pre-recorded video and the like is generally contemplated as time-based media, it will be appreciated that time-based media may more generally include any media that changes over time such as sound recordings, radio programs, music, slide shows, animations, animated graphics, video games, and so forth, any of which may be stored on a pre-recorded medium, received over a data network, received through a cable data network, received through an aired broadcast, or otherwise made available in a locally reproducible form as a time-based media presentation.

The media platform 116 may be any device or combination of devices that receives a time-based media presentation from the media source and renders the time-based media presentation for viewing. This may include without limitation a computer, cable set top box, satellite dish, stereo, television, and so forth, as well as combinations of the foregoing. Thus for example a consumer may install a satellite dish, authenticate a satellite decoder over a telephone land line, decode satellite signals with a satellite decoder to provide a time-based media presentation in electronic form, and render the time-based media presentation using a television to render the video images and a stereo to render the audio portion 118.

The audio portion 118 of the time-based media presentation may be reproduced as sound energy in a viewing environment. The client device 102 may in general capture the audio portion 118 using the microphone 110 and analog-to-digital converter 109 to provide digital samples of the audio portion. These digital samples may be further processed by the client device 102 and used in a synchronization process as described in further detail below.

The data network 120 may include any data network such as, for example, the Internet, as well as any intermediate data networks or devices between the client device 102 and the server 122, such as local area data networks, Internet service providers, air interfaces to cellular or telecommunications company infrastructures, and so forth, as well as cable, telephone, or satellite infrastructure adapted for data communications. All such variations that can provide end-to-end data communications between the client device 102 and the server 122 may serve as the data network 120 described herein.

The server 122 may be any combination of hardware and software capable of responding to requests over the data network 120 from the client device 102. The server 122 may, for example, include a web server that responds to HyperText Transfer Protocol requests, or any other standard or proprietary information server that supports sessions with client devices for exchange of information as more generally described herein through a data network interface 124. The server 122 may also include a database 126, such as a relational database, lookup tables, files, and so forth, that stores information such as hash tables for pre-processed media, all as described in greater detail below. Any database capable of information retrieval consistent with operation of the server 122 as described herein may be used as the database 126 of the server 122.

Data network content sources 128 may be any sources of content connected to the data network 120. As generally discussed below, once the client device 102 is synchronized to a time-based media presentation, the client device 102 may retrieve and render synchronized content, either from the server 122 that provides synchronization functions, or any other data network content sources 128 such as web sites, advertisement servers, streaming media servers, e-commerce sites, or any other remote site or resource. The additional content synchronized to the time-based media presentation may, for example, include a supplemental video stream, contextual information, advertising, interactive content, and any other content that might be related to the time-based media presentation, and more specifically, to a particular time offset within the time-based media presentation. In general, the synchronized content may be retrieved on an as-needed basis during a presentation, or pre-cached for some or all of the presentation so that it is locally present in the memory 104 of the client device 102 at the appropriate time.

Figure 2:
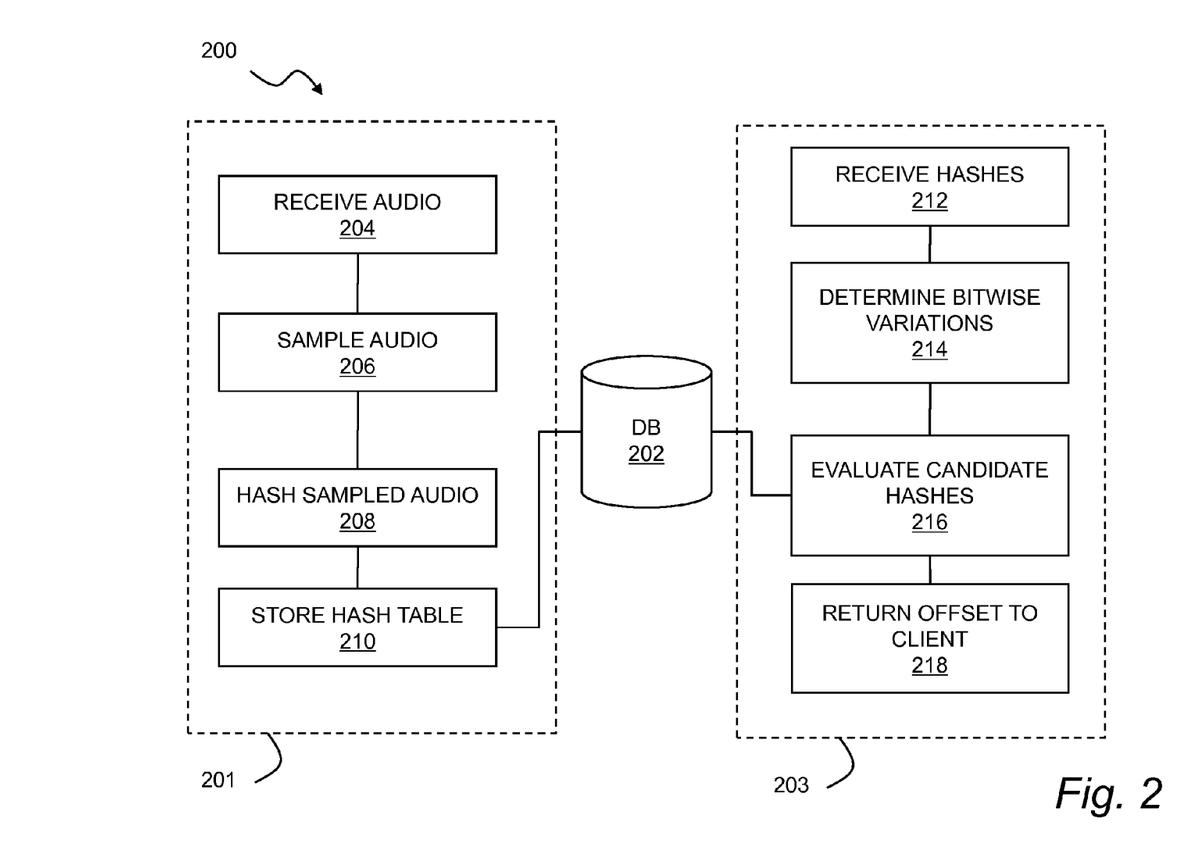
FIG. 2 is a flow chart of a server-side process for synchronization.

FIG. 2 is a flow chart of a server-side process for synchronization. In general, the process 200 may include pre-processing 201 of media to store hash tables or the like in a database 202, and responding to client requests for synchronization 203 based upon the hash tables for the pre-processed media, all as more specifically described below.

As shown in step 204, the process 200 may begin by receiving an audio portion of a time-based media presentation such as any of the media from any of the media sources described above.

As shown in step 206, the audio may be sampled into a sequence of digital samples from the audio portion. This may include digitizing an audio rendering of the audio portion, or where the media is available in digital format, simply copying the digital audio, or a subset of the digital audio to provide a sequence of digital samples for further processing.

As shown in step 208, a plurality of hashes may be calculated from the sequence of digital samples of the time-based media presentation. In general, the plurality of hashes may be a time wise sequence of hashes corresponding to digital samples of audio from the time-based media presentation. Each one of the plurality of hashes may be a non-unique representation of a portion of audio from the time-based media presentation corresponding to a particular time offset within the time-based media presentation.

A variety of hashing functions are known in the art and may be adapted to the audio-based synchronization systems described herein. One such hashing function is described in Ke et al., *Computer Visions for Music Identification*, the entire content of which is incorporated herein by reference. While Ke proposes a hashing function for us in music identification, the hashing algorithms of Ke can be adapted to synchronization as generally described herein. In one embodiment, a useful hashing function may include processing as described in greater detail below.

As an initial step, the amount of data from digital samples obtained at the native sampling rate may be reduced by selecting a subset of the digital samples at some predetermined frequency, e.g. every other sample, every third sample, and so forth. The digital samples may also or instead be down-sampled to a predetermined frequency such as about five thousand five hundred Hertz (5.5 kHz) so that hashing can be performed consistently across multiple audio receiver types. The digital samples may also or instead be windowed to provide a sequence of overlapping, windowed data sets. In one embodiment, each one of the sequence of data sets may be obtained from a window of 1024 samples, with each window offset by 64 samples, thus providing a high degree of overlap for each windowed data set. More generally, any offset and/or window set consistent with the synchronization processes described herein may be employed.

Each windowed data set (or sequence) of digital samples may also or instead be process by normalizing a magnitude of the sequence of digital samples to some predetermined value. This step helps to mitigate differences in playback volume of a presentation, sensitivity of audio receiving hardware, distance from the media platform (or speakers of the media platform), room size, and other environmental conditions that might affect the sound captured by the client device. Each sequence of digital samples may also or instead be band pass filtered or low pass filtered, which may include filtering with a low pass filter to provide a filtered output. This may include the use of a digital filter having a 3 dB cutoff of 2.2 kHz, or about two kilohertz, or any other suitable digital and/or analog filter to reduce noise and suppress signal components outside the range of interest.

However processed, each sequence of digital samples may be transformed into a frequency-domain representation using, e.g., a discrete Fourier transform or other suitable algorithm. The frequency-domain representation may then be hashed by dividing the frequency spectrum into a number of frequency bands and converting the signal energy in each band into a binary value according to the relative power in each band compared to each other one of the frequency bands within the frequency-domain representation. In one aspect, the spectrum may be divided into thirty two bands, with each band represented by a single bit (e.g., a one or a zero) to provide a thirty two bit hash of the sequence of digital samples. The spectrum may be divided in a number of ways, such as linearly into equal size bands or logarithmically into bands of logarithmically increasing bandwidth. The resulting hash, which provides a compact non-unique description of the sampled audio, may then be accumulated with additional hashes for further processing.

As shown in step 210, the sequence of hashes may be stored, along with the corresponding one or more time offsets in a hash table that permits retrieval of the one or more time offsets with a hash value. The hash table may, for example, be stored in a database on a server configured to respond to a request from a client device.

The above pre-processing 201 may be performed any number of times for any number of time-based media presentations, with hash tables for each media item stored in the database 202 for subsequent synchronization processes. Turning now to the synchronization process 203, the following steps detail the manner in which a server responds to client requests. In general, the server may be configured to respond to a request from a client device containing a number of hashes (and explicit or implicit sequence numbers for the hashes) with a number of candidate time offsets corresponding to each one of the hashes. In general, the candidate hashes may be resolved into an offset within the time-based media presentation by the server, or forwarded to the client for further processing. By performing this additional processing at the server, the client is relieved of further synchronization calculations and the offset can be advantageously transmitted over a data network as a single numerical value.

As shown in step 212, a server may receive a number of hashes from a client device. These hashes generally include hashes calculated at the client device based upon audio data acquired by the client device. The server may also receive supplemental information to assist in a synchronization process, such as explicit sequence numbers for each hash and/or a unique identifier of the time-based media presentation that explicitly identifies the presentation to the server. While the systems and methods described herein may be employed without such an identifier, this information can greatly simplify and speed synchronization calculations by reducing the data set against which the server must search for candidate time offsets.

As shown in step 214, a number of bitwise variations to each received hash may be identified. In general, this includes determining an allowable bit error for the hash, or a number of allowable bitwise variations that are to be evaluated in subsequent synchronization processing, which value may for example be stored in the memory of the client device and transmitted to the server. Finding the bitwise variations to the hash may also be described as determining all values within a specified Hamming distance of the calculated hash, which provides a certain allowance for variations between the ideal source audio (used for pre-processing as described above) and the audio portion of a presentation as captured and digitized by a client device. With a predetermined allowable bit error, all of the binary values within that number of bits of the hash may readily be determined using any suitable technique. One useful technique is described in greater detail below with reference to FIG. 3. Other techniques are known in the art and may be useful employed to calculate bitwise variations to a hash as described herein. In one embodiment, the hash may include thirty two bits, and the allowable bit error may be eight bits. The resulting candidate hashes provide a basis for further synchronization processing that accommodates variations in the audio as captured by the client device.

It will be understood that while calculation of candidate hashes is described above as a server-side function, the candidate hashes may also or instead be calculated by a client with suitable processing capability and communication bandwidth without impairing general operation of a synchronization process as described herein.

As shown in step 216 the candidate hashes may be evaluated to determine an actual offset within a time-based media presentation. For each candidate hash (which has a relative offset to other candidate hashes), any corresponding time offsets are retrieved from the hash table and a count or score is incremented for each one of the corresponding time offsets. A score or count is accumulated for each time offset retrieved from the hash table, with the scoring for each time offset shifted according to the sequence number (or time) of the corresponding candidate hash. In this manner, an offset within the time-based media most closely corresponding to a beginning of the hashes received from the client can be identified.

By way of simplified, illustrative example, the first client hash may produce two candidate hashes, and the two candidate hashes may yield three offsets at t=5, t=6, and t=10. The second client hash may produce two candidate hashes that yield from the hash table four offsets at t=6, t=10, t=14, and t=15. However, this second group of offsets must be shifted back one time increment to align with the previous group, so the second group would be used to accumulate a score at t=6−1=5, t=10−1=9, t=14−1=13, and t=15−1=14. Using a simple count, the accumulated scores would then be 2 at t=5, 1 at t=6, 1 at t=9, 1 at t=10, 1 at t=13, and 1 at t=14. A third client has may produce two candidate hashes that yield a single offset at t=14. Again, this third group must be shifted back (two time increments) to align with the previous groups, so the third group would accumulate a score at t=14−2=12. At this point the best score occurs at t=5, and an inference may be drawn that the time at which the first hash was calculated at the client device corresponds to an offset of t=5 within the time-based media presentation. It will be readily appreciated that for a preferred embodiment using a thirty two bit hash and a Hamming distance of eight, a significantly greater number of time offsets will actually be produced. However, the same basic approach may be employed to accumulate or otherwise score potential offsets within the media based upon time offsets retrieved from the hash table for candidate hashes.

As shown in step 218, the best score from among the plurality of scores may be used to select and return to the client an offset within the time-based media presentation corresponding to the beginning of the sequence of hashes sent by the client device. It will be understood that the offset returned to the client may also or instead include the time corresponding to the last of the sequence of hashes, or some other offset such as a median offset or an offset adjusted for network latency. It should also be understood that the server may only conditionally return an offset, such as when the best score reaches some predetermined minimum, or when a score for one offset is greater than all other scores by some predetermined relative or absolute amount, or based upon any other criteria that might be used to evaluate the quality of the score(s) and/or the inferences drawn therefrom. In one practical implementation with scoring weighted according to the number of bits in each hash (e.g., a score of thirty two for each retrieved time offset), useful criteria for a reliable synchronization include a minimum score of five thousand and a score of at least twice the next greatest score. Of course, other combinations of criteria may also or instead be used to determine whether and when to return an offset to a client device.

Figure 3:
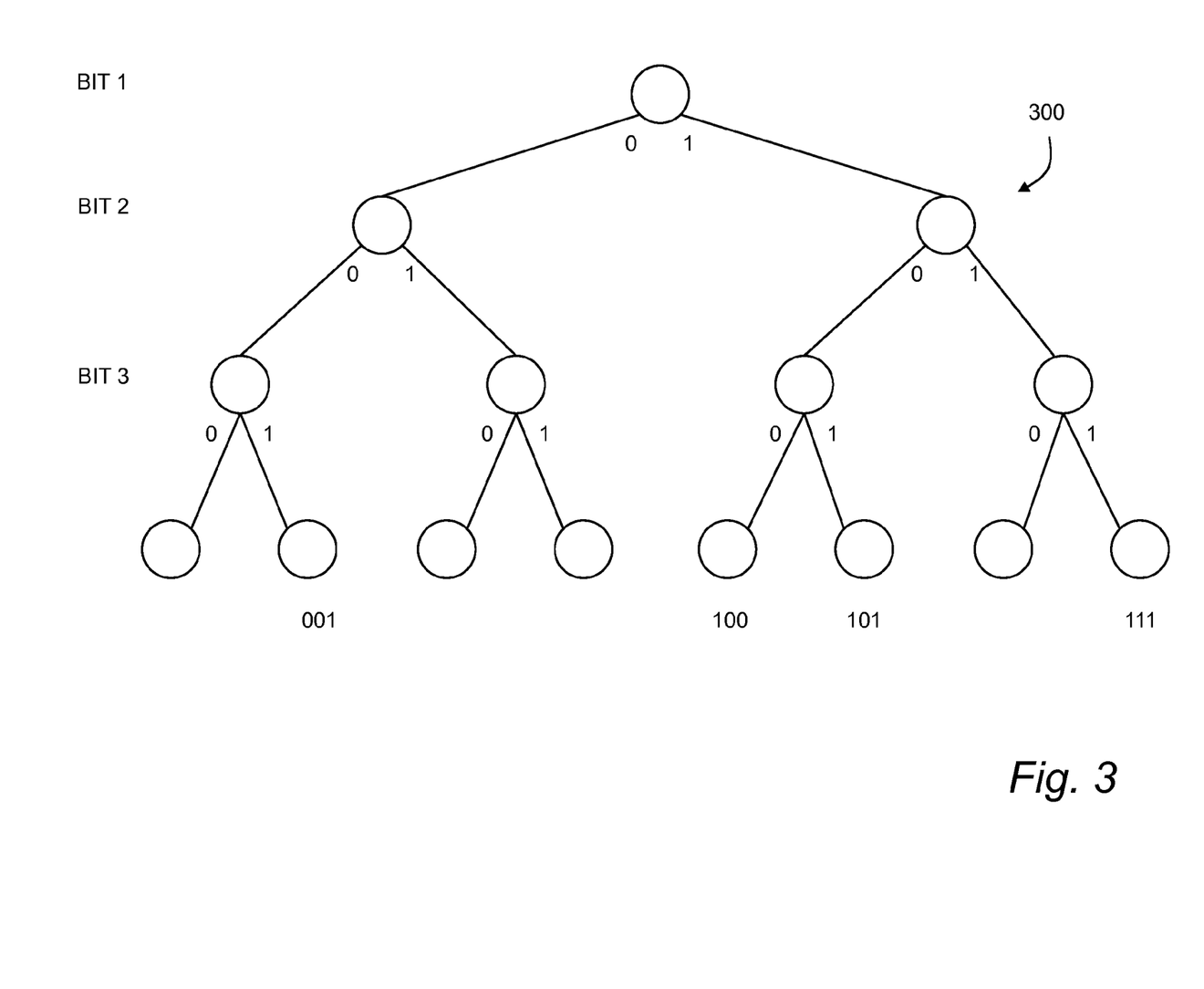
FIG. 3 illustrates a technique for identifying bitwise variations to a binary value.

FIG. 3 illustrates a technique for identifying bitwise variations to a binary value. As described above, a synchronization process may include a step of identifying candidate hashes corresponding to bitwise variations in a hash value calculated by a client or, as alternatively stated, determining a number of bitwise variations to a calculated hash. As described below, these candidate hashes may be determined using a binary tree or binomial tree that is traversed in a manner that excludes branches of the tree for binary values that exceed the allowable bit error for, i.e., Hamming distance from, the calculated hash.

In order to efficiently locate hash values that differ by a certain number of bits from a calculated hash, the server may create a binomial tree data structure 300 to hold loaded hash values. In a thirty two bit embodiment, the data structure 300 has thirty two levels with one level for each bit position in the hash. Each level includes left and right branches corresponding to zeroes and ones in a bit position of the hash value. In the simplified, illustrative embodiment of FIG. 3, the data structure 300 stores a three bit hash value. Starting at the top of the tree, a binary value of 101 would follow a path through the tree and be placed into a corresponding bucket (labeled "101") at the bottom of the data structure 300. In order to find hash values varying by not more than one bit, a search algorithm can traverse each leg of the tree as far as possible without traversing a branch that has more than one bit difference from the calculated hash (in this case resulting in terminals at "001", "100", and "111"). The efficiency in this approach results from the ability to avoid traversing branches that would not result in hashes within the desired Hamming distance. While the data structure 300 of FIG. 3 may appear simple, the processing gains are substantial for a thirty two bit hash and up to eight bits of variation. In general, the candidate hash values are not stored in the data structure 300. Rather, the candidate hash values are implied by the branch traversal that leads to a bucket at the bottom of the tree, with each terminal bucket representing a candidate hash, and containing zero or more position indices or time offsets corresponding to the implied candidate hash value. Thus, traversing the data structure 300 according to the bit error limits leads directly and efficiently to the hash table results for the calculated hash received from a client device. Thus in one aspect determining bitwise variations (FIG. 2, step 214) and evaluating candidate hashes (FIG. 2, step 216) to find candidate offsets may be combined into a single processing step. Other techniques suitable for identifying and evaluating candidate hashes will readily be appreciated, any of which may also or instead be adapted for use in the synchronization systems and methods disclosed herein.

Figure 4:
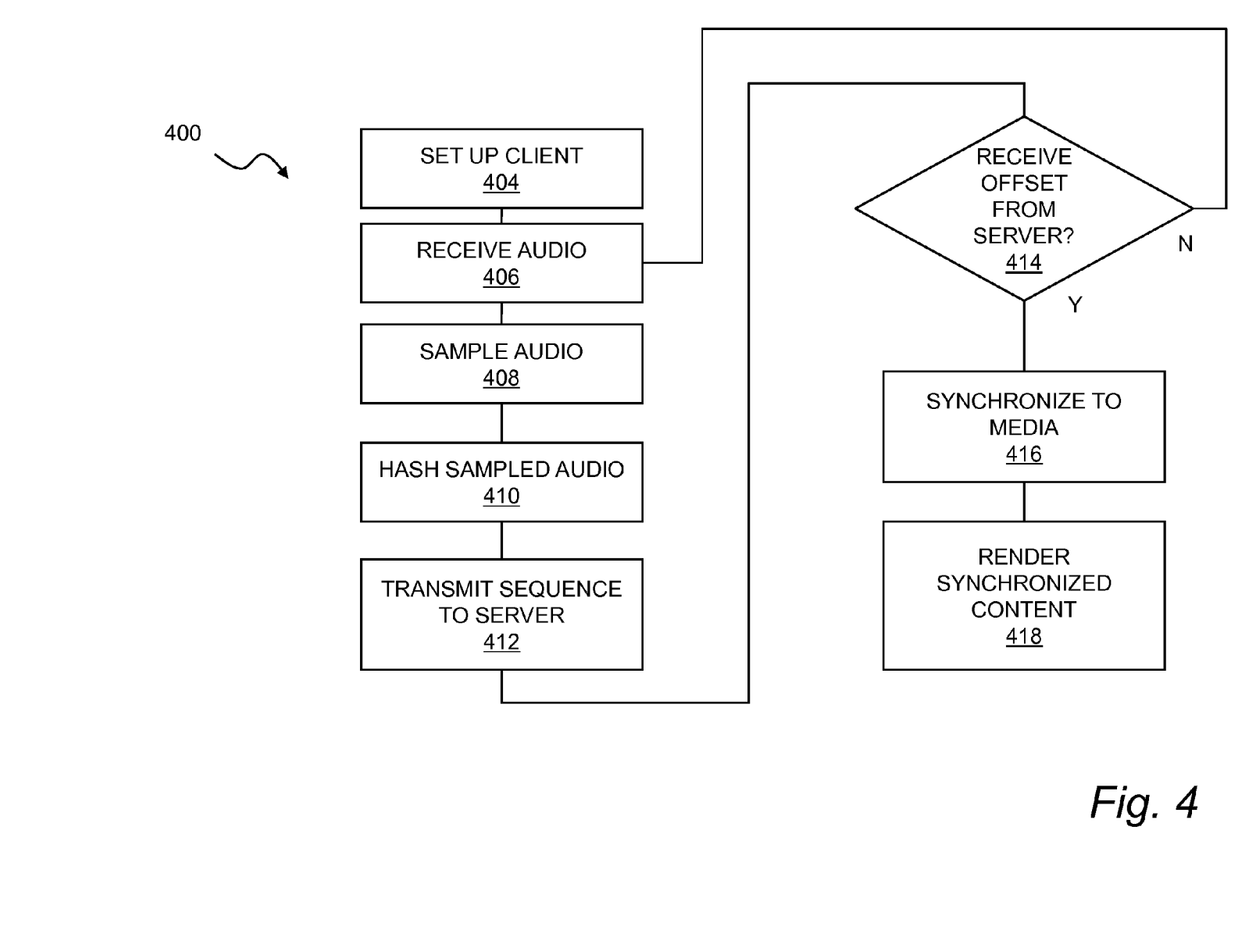
FIG. 4 is a flow chart of a client-side process for synchronization.

FIG. 4 is a flow chart of a client-side process for synchronization. The process 400 may in general include processing received audio to generate a sequence of hashes, and then transmitting the hashes to a server for remote calculation of a time offset in a time-based media presentation, after which a client device, which may be any of the client devices described above, may render synchronized content.

As shown in step 404, a client device, which may be any of the client devices described above, may be set up for synchronization such as by installing an application on the client device that performs synchronization functions, and/or any applications that might use synchronization to retrieve and/or display synchronized content. This may also or instead include establishing programming interfaces on the client device between existing applications and a synchronization application so that programs that are already installed (such as media players, web browsers, and so forth) can render synchronized content.

As shown in step 406, the client device may receive audio. This may, for example, include receiving an audio portion of a time-based media presentation with a microphone of the client device.

As shown in step 408, the client device may sample the audio, such as by using the analog-to-digital converter to provide a plurality of digital samples, and may receive at the processor a sequence of digital samples obtained with a sampling rate that establishes a time-based relationship among the sequence of digital samples. In one aspect, the subsequent hashing steps may be performed on overlapping windows of digital audio data, so that a next sequence of digital samples is obtained from an overlapping window of the audio portion of the time-based media presentation. In this manner, the windowing provides a series of overlapping sets of digital samples from the raw sequence of digital samples. The sets of digital samples may be further processed, such as be preserving only a subset of digital samples for processing, e.g., every other sample, every third sample, every eighth sample, or any other reduced data set consistent with proper functioning of subsequent synchronization functions.

As shown in step 410, the digital samples, such as a sequence or set of windowed digital samples, may be processed into a hash including a number of bits that non-uniquely corresponds to a portion of the time-based media presentation (and a time offset of that portion within the presentation). Over numerous repetitions of the process, a number of sequential hashes may be obtained for overlapping windows of digital samples. Each one of the hashes is derived from the content of a corresponding audio portion of the time-based media presentation, but does not uniquely identify the audio portion that it was derived from. That is, numerous segments of audio from the presentation may yield the same hash. Each one of the hashes may also have a sequence number, or a relative time offset to each other one of the plurality of hashes. These relative time offsets are generally not absolute in terms of the presentation, but may serve as an accurate indicator of the relative timing of each window of digital samples from which a hash was obtained. More generally, hashes may be prepared in a complementary process to the hashing performed on the pre-processed media as described above. More generally, any suitable processing to the digital samples may be performed consistent with the processing performed on the pre-processed media so that matching and synchronization can be performed.

As shown in step 412, a sequence of hashes may be transmitted to a server, along with any additional information such as a unique identifier for the time-based media presentation from which the hashes were derived and a sequence number for each one of the sequence of hashes indicated a relative time offset among the hashes. The time-based media presentation may be identified in a number of ways. For example, a user of the client device may manually identify the media-based presentation, or may provide descriptive information helpful in identifying the media such as a title of a television series, biographical data (actors, content, etc.), a time, date, and/or channel on which the media was broadcast, or any other useful information. In another aspect, the media may be identified using remote content analysis, such as by streaming audio or video samples directly to a remote server. While this process may be relatively bandwidth and/or computationally expensive, it may be performed one time prior to a synchronization, after which the more efficient synchronization techniques described herein may be employed to determine an offset within the time-based media presentation.

As shown in step 414, the client device may determine whether an offset has been received from the server. If an offset has been received from the server indicative of a time offset within the time-based media presentation, the process 400 may proceed to step 416 where the client device synchronizes based on the offset. If any offset has not been received, the process 400 may return to step 406 and the client device may receive, sample, and hash additional audio content for forwarding to the server. The server may also or instead respond with an explicit indication of a failure to determine the offset. Where an offset is returned, the offset may be provided as a specific offset within the time-based media presentation as generally described above, or a number of candidate offsets may be returned to the client device for local evaluation.

As shown in step 416, the client device may synchronize to the time-based media presentation based upon the offset received from the server, such as by storing in an application on the client device a current offset within the time-based media presentation. The local application may then coordinate synchronized activities on the client device such as retrieving relevant content, launching additional media viewers, web browsers, interactive programs or applets, and so forth. A synchronization indicator may be displayed on the client device indicating that a reliable synchronization has been achieved using, e.g., an icon or symbol on a display of the client device, or another indicator such as an audible tone, a flashing light-emitting diode, an animation, and so forth. Once synchronization has been achieved, the client device may autonomously maintain synchronization by assuming uninterrupted delivery of the time-based media presentation, and/or the client device may continuously or periodically confirm synchronization with additional sequences of hashes transmitted to the server.

As shown in step 418, once the client device has synchronized to the time-based media presentation, synchronized content may be rendered on the client device. This may include any additional content such as supplemental streaming video, textual information, interactive content, advertisements, hyperlinks, and so forth. An application on the client device that coordinates synchronization using the remote server may also control rendering of the additional content in a manner that is synchronized to the time-based media, either by directly rendering the content or by controlling one or more other applications on the client device to render the content.

In addition, audience feedback concerning the time-based media presentation may be gathered from time-shifted views of the presentation and correlated to audience feedback from a live presentation. The feedback may, for example, be gathered explicitly with user inputs to the client device, or implicitly such as by detecting a change of channel or termination of the presentation using, e.g., the audience tracking techniques described below. Thus in one aspect there is disclosed herein a technique for combination additional audience (or client device) feedback from time-shifted viewing with live audience feedback to provide feedback data that aggregates audience feedback synchronized to both a liver version of the presentation and a time-shifted view of the presentation.

It will be understood that the steps of the above methods may be varied in sequence, repeated, modified, or deleted, or additional steps may be added, all without departing from the scope of this disclosure. By way of example various processing steps may be performed on the server, on the client device, or some combination of these. In addition, a client device may synchronize to multiple media sources at one time, and a server may be configured to support synchronization of multiple clients at one time. Thus the details of the foregoing will be understood as non-limiting examples of the systems and methods of this disclosure.

Figure 5:
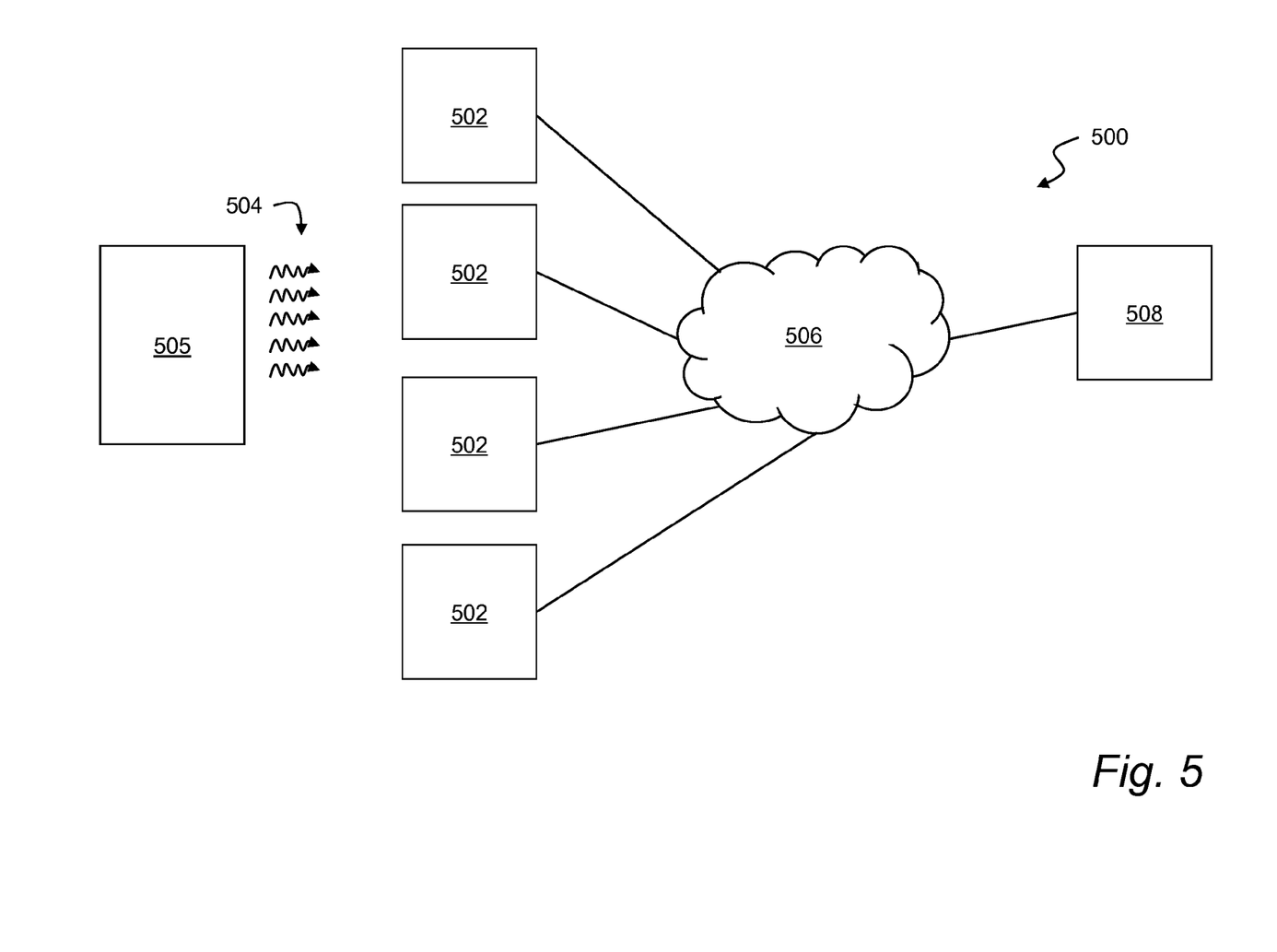
FIG. 5 is a block diagram of an audience tracking system.

FIG. 5 is a block diagram of an audience tracking system. In general, the system 500 may include a number of client devices 502 receiving audio 504 from a media source 505 such as a television broadcast. The client devices 502 may process the audio 504 to derive a sequence of hashes that are transmitted over a data network 506 to server 508 where analysis can be performed.

The client devices 502 may, for example, be any of the client devices described above. While four client devices 502 are depicted, any number of client devices 502 may participate in the system 500, including any combination of client devices 502 at one geographic location and/or numerous geographic locations. Each client device 502 may receive the audio 504 and create a sequence of hashes that characterize audio content within the audio 504. This may include any of the hashing processes described above, or any other hashing process that uniquely or non-uniquely identifies the audio content.

The media source 505 may, for example, include televisions systems or stereo or other audio output systems rendering media such as a live television broadcast. Where the client devices 502 are geographically distributed, the media source 505 may likewise include hardware rendering the broadcast at a variety of locations including public locations such as airports, lounges, waiting rooms, and so forth, as well as private locations such as homes or offices, as well as any combination of these.

The data network 506 may include any of the data networks described above, and the server 508 may include any server or combination of servers or the like capable of receiving sequences of hashes from client devices 502 and processing the sequences of hashes as described further below.

Figure 6:
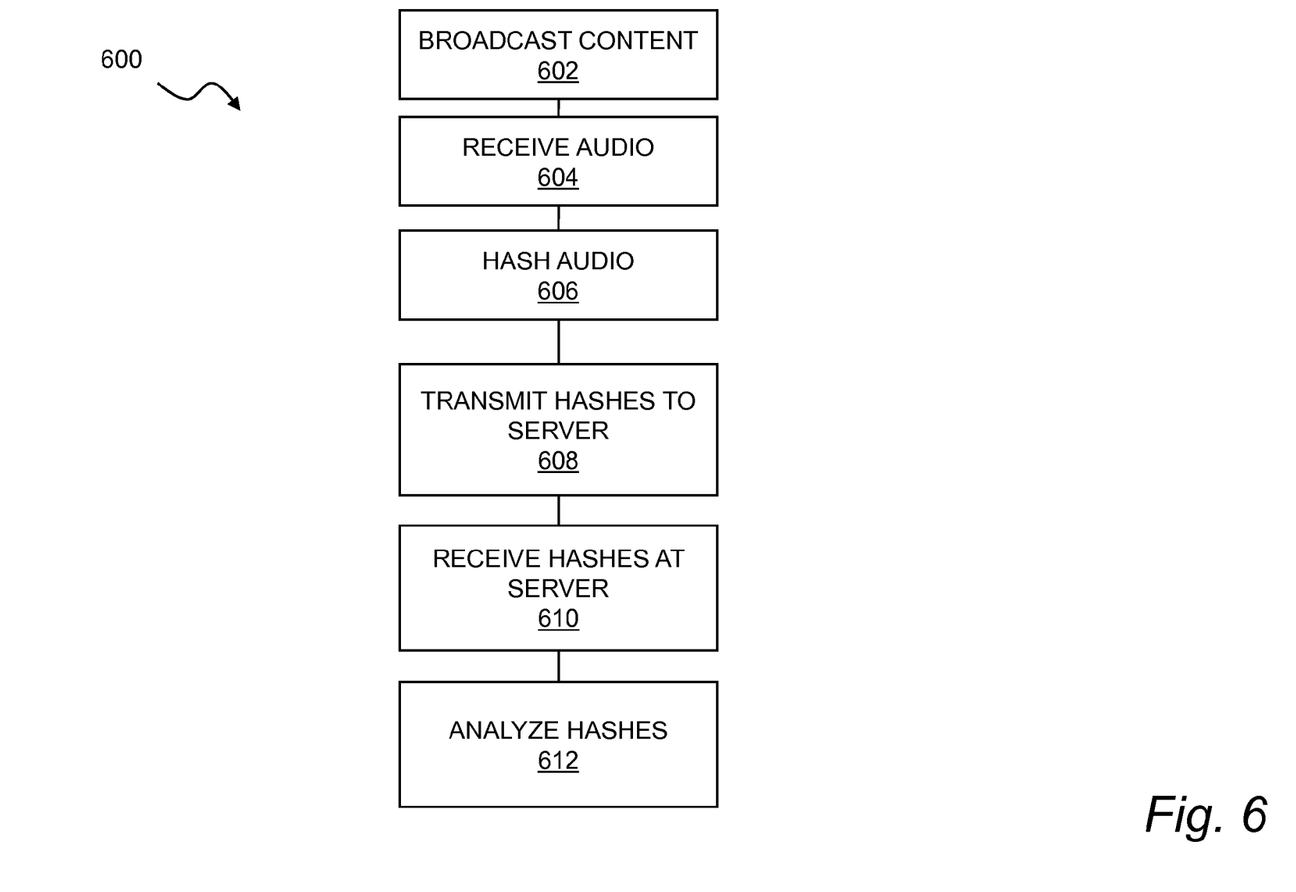
FIG. 6 is a flow chart of an audience tracking process.

FIG. 6 is a flow chart of an audience tracking process. In general the process 600 includes hashing audio content at a number of client devices and forwarding the resulting sequences of hashes to a server for analysis.

As shown in step 602, the process 600 may begin by broadcasting media having an audio component. The broadcast media may include televised programming such as any live or pre-recorded television content including a television series, a movie, a sports event, informational programming, news, and so forth.

As shown in step 604, audio content from the broadcast media may be received by a number of client devices exposed to the broadcast media.

As shown in step 606, each client device may hash or otherwise process the audio content into a time-based sequence of hashes that uniquely or non-uniquely identify the audio content in the broadcast media at a particular time.

As shown in step 608, each client device may transmit the sequence of hashes to a server, such as any of the servers described above.

As shown in step 610, the server may receive the sequence of hashes from each participating client device, along with related information such as any explicit supplemental information provided by each client device, or information such as an IP address or the like for each client device, any of which may be usefully processed by the server to assist with subsequent analysis.

As shown in step 612, the server may analyze the sequences of hashes received from the participating client devices. A variety of useful inferences may be drawn from the resulting data set, including monitoring of audience behavior (such as channel changing) and advertising characteristics as described below. It will be readily appreciated that a range of additional statistics and conclusions may also or instead be extracted from the data set.

In one aspect, sequences of hashes from client devices exposed to a broadcast may be monitored in order to create descriptive signatures dynamically. For example, as client devices receive a broadcast, they may each create a sequence of hashes for the server. A general location for each client device may also be specified in advance by the client device, or inferred from the content that is being broadcast or other data such as the IP addresses for the client devices. As the client-generated signatures for a broadcast are received by the server, these submissions may be processed and an average or other composite signature may be obtained. A variety of techniques for combining or otherwise characterizing such variations may be employed. However derived, the composite signature may be stored and subsequently applied to correlate new references to the broadcast program to a particular time within the original broadcast. This may be useful, for example, when a viewer is watching a program on a time-shifted basis, such as to synchronize supplemental content to the time-shifted view. In this manner, the pre-processing described above may be omitted, and hash tables or the like for time-shifted synchronization may be created automatically from the sequences of hashes received from client devices during the live broadcast.

In another aspect, the sequences of hashes may be analyzed to identify when local commercials are being aired. When a program is on, the averaged audio signals and the resulting sequences of hashes from client devices may remain within a narrow band based upon the underlying content. However, during commercial breaks, content may vary significantly based upon the advertising that is broadcast by each local network. When this happens, there may be a spike or other measurable change in signatures that varies according to the corresponding variation in advertisement content. This information may be usefully employed to infer a geographic location of client devices and for any other related purposes. This information may also or instead be used to distinguish between advertisements and other broadcast content, which may be usefully employed, for example, to determine how to relate post-broadcast signatures to the originally-broadcast content. Thus more generally, based upon server analysis of sequences of hashes, the process 600 may include identifying an occurrence of a commercial break in the television broadcast based upon variations in concurrent ones of the plurality of hashes received from different ones of the client devices.

In another aspect, the sequences of hashes may be analyzed to identify network commercials. It has been observed that when commercials begin, a certain percentage of the public changes the channel. This will cause a deviation in the average audio signal band, but it will be the case that this deviation will occur to some extent in all localities. This pattern in received, client-generated signatures may be used to infer an occurrence of a commercial break. By extracting out the deviations and looking at the averaged data of those who have chosen to stay on the commercials, it will be possible to determine whether the commercials being played are network-wide or are local.

Thus in one aspect, the process 600 may include identifying a channel change in proximity to one of the client devices based upon a variation in the sequence of hashes received from the client device. In another aspect, the process 600 may include inferring a geographic proximity among two or more of the client devices based upon a similarity in concurrent ones of the hashes received from two or more the plurality of devices. In still another aspect, the process 600 may include determining whether a local advertisement or a network advertisement is being aired during a commercial break based upon variations among the hashes received from the various client devices.

Still more generally, by processing audio content from a broadcast device (such as a television or radio) on a client device and transmitting characteristic information to a server, the server can derive a variety of useful metrics that describe the broadcast stream as well as audience location, audience engagement in broadcast content, and so forth.

It will be appreciated that many of the above systems, devices, methods, processes, and the like may be realized in hardware, software, or any combination of these suitable for the data processing, data communications, and other functions described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

In other embodiments, disclosed herein are computer program products comprising computer-executable code or computer-usable code that, when executing on one or more computing devices (such as the devices/systems described above), performs any and/or all of the steps described above. The code may be stored in a computer memory or other non-transitory computer readable medium, which may be a memory from which the program executes (such as internal or external random access memory associated with a processor), a storage device such as a disk drive, flash memory or any other optical, electromagnetic, magnetic, infrared or other device or combination of devices. In another aspect, any of the processes described above may be embodied in any suitable transmission or propagation medium carrying the computer-executable code described above and/or any inputs or outputs from same.

It will be appreciated that the methods and systems described above are set forth by way of example and not of limitation. Numerous variations, additions, omissions, and other modifications will be apparent to one of ordinary skill in the art. While particular embodiments of the present invention have been shown and described, it will be apparent to those skilled in the art that various changes and modifications in form and details may be made therein without departing from the spirit and scope of the invention as defined by the following claims. The claims that follow are intended to include all such variations and modifications that might fall within their scope, and should be interpreted in the broadest sense allowable by law.

What is claimed is:

1. A method comprising:
   receiving a plurality of hashes of audio content over a data network from a plurality of client devices;
   identifying a number of client devices from the plurality of client devices exposed to a particular television broadcast based upon a similarity of a first group of concurrent hashes from the number of client devices;
   detecting a deviation in a second group of concurrent hashes among the number of client devices;
   based upon the deviation, inferring a commercial break in which a first group of the number of client devices has changed channel and a second group of the number of client devices have stayed on a commercial break in the particular television broadcast; and
   analyzing averaged data for a third group of concurrent hashes from the number of client devices to determine whether a commercial being played to one or more of the number of client devices is a local commercial or a network-wide commercial.

2. The method of claim 1 further comprising identifying a channel change in proximity to one of the plurality of client devices based upon a variation in the ones of the plurality of hashes received from the one of the plurality of client devices and other ones of the plurality of hashes received concurrently from other ones of the plurality of client devices.

3. The method of claim 1 further comprising inferring a geographic proximity among two or more of the plurality of client devices based upon a similarity of concurrent ones of the plurality of hashes received from the two or more of the plurality of client devices during the commercial break.

4. The method of claim 1 wherein the plurality of client devices include one or more of a laptop computer, a notebook computer, a netbook computer, a cellular phone, and a personal digital device.

5. The method of claim 1 wherein each one of the plurality of hashes includes a processed representation of digital samples of the audio content captured by each one of the plurality of client devices.

6. A computer program product embodied in a non-transitory computer readable medium, the computer program product comprising computer executable code that, when executing on one or more computing devices, performs the steps of:
   receiving a plurality of hashes of audio content over a data network from a plurality of client devices;
   identifying a number of client devices from the plurality of client devices exposed to a particular television broadcast based upon a similarity of a first group of concurrent hashes from the number of client devices;
   detecting a deviation in a second group of concurrent hashes among the number of client devices;
   inferring a commercial break in which a first group of the number of client devices has changed channel and a second group of the number of client devices have stayed on a commercial break in the particular television broadcast based upon the deviation; and
   analyzing averaged data for a third group of concurrent hashes from the number of client devices to determine whether a commercial being played to one or more of the number of client devices is a local commercial or a network-wide commercial.

7. The computer program product of claim 6 further comprising code that performs the step of identifying a channel change in proximity to one of the plurality of client devices based upon a variation in the ones of the plurality of hashes received from the one of the plurality of client devices and other ones of the plurality of hashes received concurrently from other ones of the plurality of client devices.

8. The computer program product of claim 6 further comprising code that performs the step of inferring a geographic proximity among two or more of the plurality of client devices based upon a similarity of concurrent ones of the plurality of hashes received from the two or more of the plurality of client devices during the commercial break.

9. The computer program product of claim 6 wherein the plurality of client devices include one or more of a laptop computer, a notebook computer, a netbook computer, a cellular phone, and a personal digital device.

10. The computer program product of claim 6 wherein each one of the plurality of hashes includes a processed representation of digital samples of the audio content captured by each one of the plurality of client devices.

* * * * *